United States Patent
Ketcham et al.

(10) Patent No.: US 6,594,272 B1
(45) Date of Patent: Jul. 15, 2003

(54) SIMPLE WIRELESS NETWORK WITH STORE AND FORWARD METHODS INCORPORATING ANTI-LOOPING CODES

(75) Inventors: Carl Ketcham, Taylorsville, UT (US); Nathan Whitney, West Jordan, UT (US); Allen Shupe, Sandy, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/447,281

(22) Filed: Nov. 23, 1999

(51) Int. Cl.[7] .................. H04L 12/26; G06F 15/173
(52) U.S. Cl. .................. 370/428; 370/231; 370/235; 370/312; 370/392; 370/448; 709/242; 709/243
(58) Field of Search .................. 370/229, 230, 370/231, 235, 236, 310, 312, 351, 389, 390, 392, 393, 400, 428, 429, 432, 445, 447, 448; 709/238, 242, 243, 244

(56) References Cited

U.S. PATENT DOCUMENTS

| | | | | |
|---|---|---|---|---|
| 5,608,726 A | * | 3/1997 | Virgile | 370/401 |
| 5,774,461 A | | 6/1998 | Hyden et al. | 370/329 |
| 5,778,116 A | | 7/1998 | Tomich | 385/16 |
| 5,806,007 A | | 9/1998 | Raith et al. | 455/574 |
| 5,822,309 A | | 10/1998 | Ayanoglu et al. | 370/315 |
| 5,845,215 A | | 12/1998 | Henry et al. | 455/553 |
| 6,052,803 A | | 4/2000 | Bhatia et al. | 714/49 |
| 6,067,291 A | * | 5/2000 | Kamerman et al. | 370/445 |
| 6,243,758 B1 | * | 6/2001 | Okanoue | 370/392 |

OTHER PUBLICATIONS

Pending U.S. patent application Ser. No. 09/447,280 filed Nov. 23, 1999.

* cited by examiner

*Primary Examiner*—William Trost
*Assistant Examiner*—Rafael Perez-Gutierrez
(74) *Attorney, Agent, or Firm*—McDonnell Boehnen Hulbert & Berghoff

(57) ABSTRACT

A plurality of wireless nodes in a network, such as elements of a residential or office home computer system, security system, HVAC or sprinkler system, or the like, communicate with each other over a radio frequency channel. A node generates a packet and transmits it to all the other nodes within range. All the receiving nodes in turn retransmit the packet to all the nodes within range of them. This process floods the network with packets, insuring that all of the nodes at the site receive the packet. The packet contains a de-looping code that is processed by all the nodes that receive the packet. The de-looping code insures that the packet is broadcast by any given node only once. Collisions resulting from multiple nodes simultaneously trying to gain access to the RF medium is avoided by implementing an exponential backoff algorithm, by which all the nodes wait for a random period of time before attempting transmission on the medium. The nodes may communicate with higher level logical domains by virtue of selected nodes functioning as bridges to higher domains. The higher level domains can include neighborhood, regional, or global networks, including global IP-based cabled networks.

18 Claims, 4 Drawing Sheets

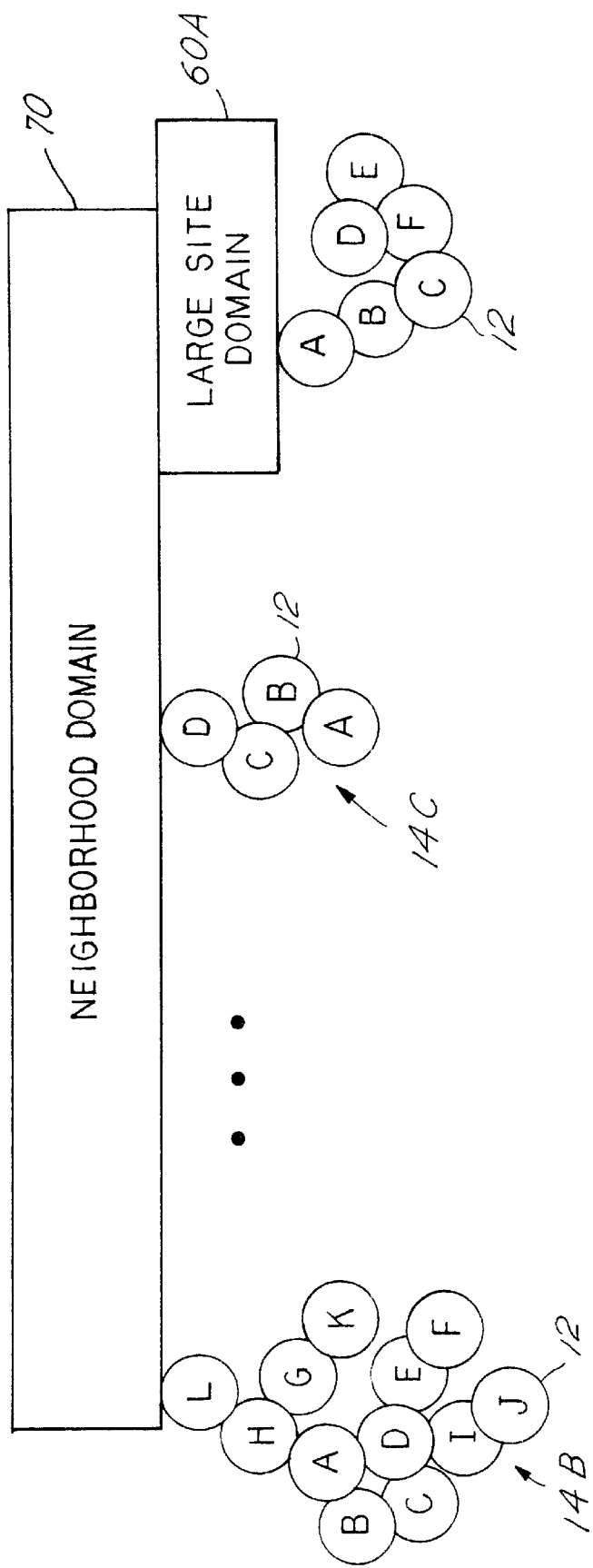

SIMPLE WIRELESS NETWORK WITH STORE AND FORWARD METHODS INCORPORATING ANTI-LOOPING CODES

BACKGROUND OF THE INVENTION

This invention relates generally to the field of architectures for networking wireless devices. The wireless devices need not necessarily be computing devices, rather they could also be low bit-rate devices such as elements of a sprinkler control system, a heating, venting and air conditioning (HVAC) system, or security system in a residence, office, or building.

More particularly, this invention relates to a network architecture and method for enabling a plurality of wireless devices to communicate with other wireless devices in a logically defined domain (such as a residence, office building or warehouse), and for enabling such devices to communicate with other devices in higher logically defined domains, such as neighborhood or global networks, including devices on local or wide area Internet Protocol (IP) based networks.

Prior art solutions for networking devices in a residential environment have tended to require expensive, highly complex Ethernet-based network equipment, similar to that found in a commercial setting. Home networking solutions generally have required significant technical expertise to install and manage. Often, the would-be purchaser of the product lacks such expertise, resulting in foregoing purchase of such systems, or experiencing frustration and further expense in getting it to operate properly. This is especially the case in getting the system to interoperate with other networks outside of the residence.

The present invention provides an architecture and technique for connecting a plurality of elements together in a network via wireless, radio frequency (RF) transmission medium. The inventive architecture and method, when carried out with existing and known RF transmission technologies, can be used to provide a significant improvement to prior art user-installed networking solutions.

As will be apparent from the description below, the type of devices or "nodes" comprising the elements of the residential or small site network is not particularly important, and can be part of a home computer system, security system, HVAC system, sprinkler system, or any other type of system that involves communication between multiple elements to carry out a particular objective.

SUMMARY OF THE INVENTION

In a first aspect, a method is provided for networking a plurality of wireless nodes that are organized into a logical domain. For example, the wireless nodes may be elements of a home security system or an office HVAC, system that are equipped with RF receiver and transmitter circuits. The logical domain may consist of all of the elements of the security system or HVAC system in the building or site where the network is located.

The method is based on a concept of flooding the domain with the packet so that every node in the domain receives the packet, but including in the packet an anti-looping code processed by the nodes that prevents the packet from being rebroadcast by any node in the domain more than once. Thus, the method includes the step of generating a packet in a first node and broadcasting the packet to all the nodes that are in range of the first node. The packet contains, among other things, an anti-looping code. The packet is received by all the nodes in range of the first node, including a second node. The second node re-transmitts or re-broadcasts the packet to all the nodes in range of the second node, including a third node. The de-looping code is processed by the receiving nodes to be sure that the receiving nodes (such as the first node, since it is in range of the second node) broadcast the packet only once.

For example, when the second node re-broadcasts the packet it may be received by a third node in range of the second node but not in range of the first node. The third node will re-broadcast the packet to all nodes in range of it. This flooding process continues until all the nodes in domain have received the packet, with each of the third and additional nodes in the domain processing the anti-looping code to thereby ensure that each of the third and additional nodes rebroadcasts the packet only a single time.

In another aspect, the packet may contain a field containing information uniquely identifying the nodes in a site or logical domain, such that any nodes that may happen to receive the packet which are not located at the site do not respond to the packet. Similarly, the packet can contain information uniquely identifying nodes in a logical sub-network, such that any nodes receiving the packet which are not members of the logical sub-network do not respond to the packet.

As another possibility, the nodes can be organized into multiple hierarchical domains. The packet may comprise a field containing information identifying a domain type, with the domain type indicating the highest domain to which the packet is to be broadcast. Some of the nodes may also function as bridges between one hierarchical domain and another. When such a node receives the packet it inspects the field containing the domain type information, and if the packet is to be broadcast to the domain lying above the node, it broadcasts the packet to nodes in the higher domain. The higher domain may be another RF network, or may be a physical, cabled network, such as a local or wide area Internet Protocol token ring or Ethernet network.

The above-described flooding concept may lead to a possibility of collisions on the RF network between multiple nodes trying to rebroadcast the packet at the same time. We have taken this possibility into account. In still another aspect of the invention, we have provided a method of governing access among a plurality of wireless nodes to an RF wireless communication medium to avoid such collisions. In this aspect, a method is provided for controlling media access of a node in a wireless network to an RF channel by which the node may communicate with other nodes in the network. In the method, if the nodes detect an existing transmission on the RF channel, then their transmission function is disabled. The nodes monitor the RF channel to detect a termination of the existing transmission. The nodes initiate transmission on the RF channel after waiting a random period of time after termination of the existing transmission has occurred. Since each node is waiting a different, randomly-determined period of time before initiating transmission on the RF channel, the chances of collision by simultaneous transmission is greatly avoided. In a preferred embodiment, each of the wireless nodes implements an exponential back off algorithm to arrive at the random period of time before initiating transmission on the wireless network.

BRIEF DESCRIPTION OF THE DRAWINGS

In the following description, reference will be made to the appended drawings, wherein like reference numbers refer to like elements in the various views, and in which:

FIG. 4 is a diagram showing how lower level, small site domains can be connected directly to higher level domains using a principle of domain collapsing.

DETAILED DESCRIPTION OF THE PREFERRED EMBODIMENT OF THE INVENTION

Figure 1:
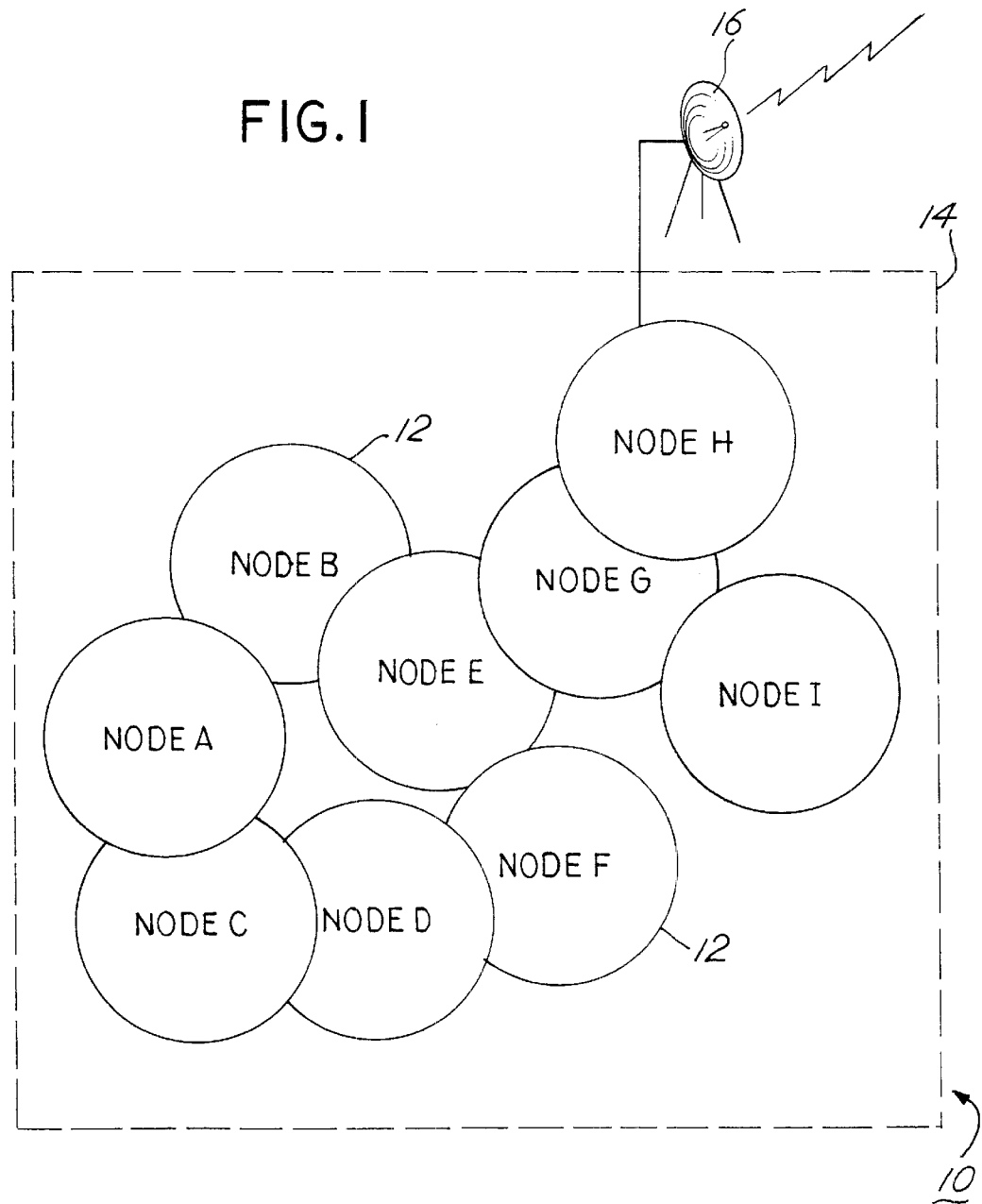
FIG. 1 is a diagram of an architecture of a network in accordance with a presently preferred embodiment of the invention.

Referring now to FIG. 1, a network 10 using the methods of the present invention may take the form as shown. The network 10 consists of a plurality of individual network elements or nodes 12, represented by Node A, Node B, etc. In the illustrated example, the nodes 12 are all physically located within a particular building or site 14, which may, for example, be a residence, office building, warehouse, or other structure.

All of the nodes 12 are considered to be part of a logical domain, namely a grouping of nodes to perform part of an overall system, such as a HVAC, sprinkler, computer, entertainment, security, or other system. In an example of a HVAC system, the nodes A–G could be considered to be thermostats in various rooms of the building, node H is a controller governing the operation of the HVAC system, and node I represents a controller attached to a heater or air conditioning unit. In the example, node H may be connected to an antenna 16 on the rooftop of the building so as to allow the HVAC controller node H to communicate with another entity in another domain, such as a utility company, home office, other building site of the company, etc. The principles of the invention apply regardless of the type of nodes and system. It will be noted that the system is particularly useful for low bit-rate systems, such as a HVAC, security, sprinkler, or other similar type of system.

Each of the nodes 12 is assumed to be physically located at the center of the circle representing the node. The perimeter of the circle represents the node's range for receiving and transmitting information in a RF communications medium. Two circles which touch or overlap are considered to be within range of each other. Thus, node A is in range of nodes B and C, but not in range of Node E or F.

The network 10 operates by a node broadcasting a communication, i.e., packet, to all the other nodes that are within range. Each of the nodes receiving the packet re-broadcasts the packet to all the other nodes that are within range of it, and so forth in an iterative fashion, until all nodes in the domain or site 14 have received the packet. This process "floods" the domain or site. To prevent a recursive or endless circulation of the packet, special coding, in the form of de-looping codes, is included in the packet to ensure that each node rebroadcasts a specific packet exactly one time. Also, special coding is included to ensure that packets from different sites, logical domains, or different subnets are ignored.

Figure 2:
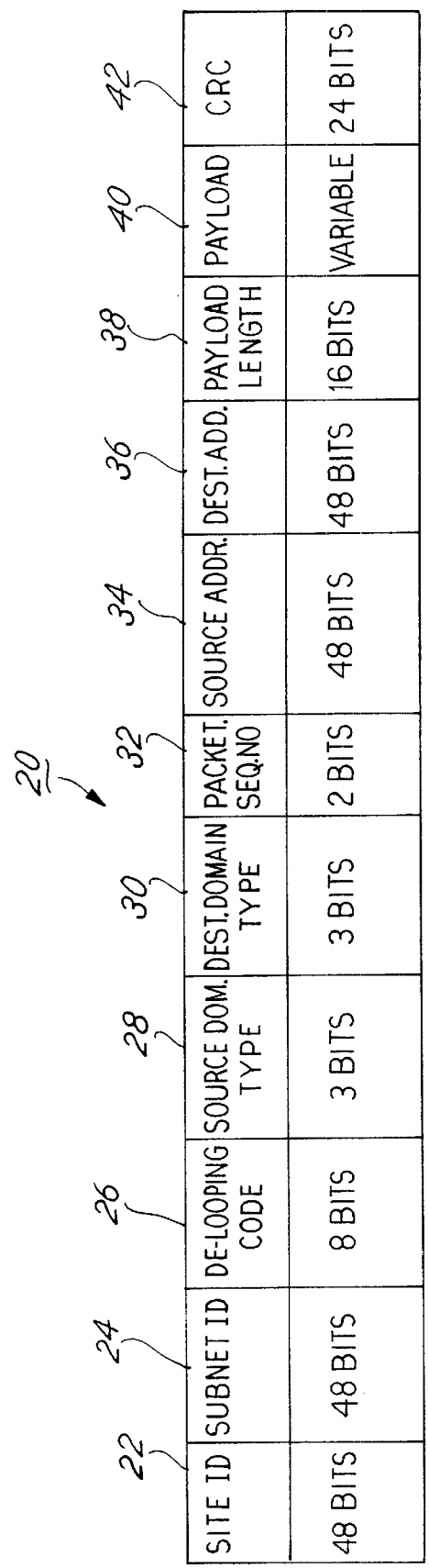
FIG. 2 is a diagram of the structure of a packet that is generated by a node in the network of FIG. 1 and circulated to the other nodes on the network (or subnetwork, as the case may be), or to higher logical domains.

A packet structure for packets generated and broadcast by the nodes of FIG. 1 is shown in FIG. 2. The packet 20 consists of the following fields: a forty-eight bit site identification field 22, a forty-eight bit subnet identification field 24, an eight bit de-looping code 26, a three bit source domain type identifying field 28, a three bit destination domain type identifying field 30, a two bit packet sequence number field 32, a forty-eight bit source address field 34, a forty-eight bit destination address field 36, a sixteen bit payload length field 38, a variable length payload field 40, and a twenty four bit cyclic redundancy check (CRC) field 42.

The site ID field 22 is used to uniquely identify nodes on a given site, such that nodes on an adjacent site that happen to receive the packet 20 ignore the packet. A "site" is defined as a residence, office, warehouse, or other physical location.

The subnet ID field 24 uniquely identifies nodes in a logical sub-network, such that nodes from an adjacent sub-network that happen to receive the packet 20 ignore the packet. Thus, subnet ID field 24 allows a subset or group of nodes in any given site to be logically grouped together and individually controlled.

The de-looping code field 26 contains an eight bit code which is determined to be unique at start-up or initialization of the system. This code is used in the algorithm described below to eliminate infinite loops of packet transmission during the process of flooding the site with packets. The derivation and use of the de-looping code is described in further detail below.

The source domain type field 28 is a three bit code which indicates the type of domain that the node originating the packet belongs to. The destination domain type field 30 indicates which domains (i.e., logical groupings or hierarchical organization) the packet is intended to be distributed. The available values in fields 28 and 30 correspond to the following defined types of domains:

0=diagnostic
1=Mobile
2=Small Site
3=Medium Site
4=Large Site
5=Neighborhood
6=Community
7=Global The packet sequence number field 32 is a code which is used in the de-looping algorithm as explained below.

The source address field 34 contains a 48 bit IEEE 802.3-style medium access control (MAC) address of the source node.

The destination address field 36 contains a 48 bit IEEE 802.3-style medium access control (MAC) address of the destination node.

The payload length field 38 contains a sixteen bit unsigned integer length of the payload field, exclusive of the other fields described herein.

The payload field 40 is a variable-length data field, containing an integer number of octets of data being transmitted by the node generating the packet 20.

The CRC field 42 is a twenty four bit CRC calculated according to the polynomial specified by the IEEE 802.3 standard.

In addition to the above fields, one or more fields reserved for future use could be part of the packet 20 structure, such as a three bit field inserted between the packet sequence number field 32 and the source address field 34. Persons skilled in the art are able to develop software for generating the packets 20 having the structure of FIG. 2.

Network Architecture

In a preferred embodiment, the network architecture is divided into logical segments or domains. As described above, there are eight different domains that are defined. The diagnostic and mobile domains are special purpose domains. The diagnostic domain is a placeholder or reserved for future definition. The mobile domain is for special types of nodes which are capable of sending and receiving data from whichever subnet is within range. All of the other domains are designed as a hierarchical scoping mechanism. The domain addressing field 30 of FIG. 2 controls and allows the node to communicate with higher level domains, including neighborhood or global domains, using bridging nodes that link one domain with another. The destination domain ID field 30 identifies the highest domain to which the packet should be sent or broadcast.

As an example, consider node A in FIG. 1 to be a temperature sensor in a commercial HVAC system. In this example, the small site may consist of temperature sensors (nodes) in a particular region or wing of the building, and the large site domain may indicate the central control system for the entire building, located some distance away. Node A indicates in field 30 that the temperature reading represented in the payload field 40 should be sent to the large site only by placing a value of 4 in field 30. All the nodes below the large site domain that receive the packet should broadcast the packet in order to guarantee that the bridging node receives the packet. By using this technique (and by providing any necessary bridging nodes that communicate between different domains in the hierarchy of domains), wherever the thermostat or element represented by node A is, receipt of the message by the node in the intended domain is ensured.

Figure 3:
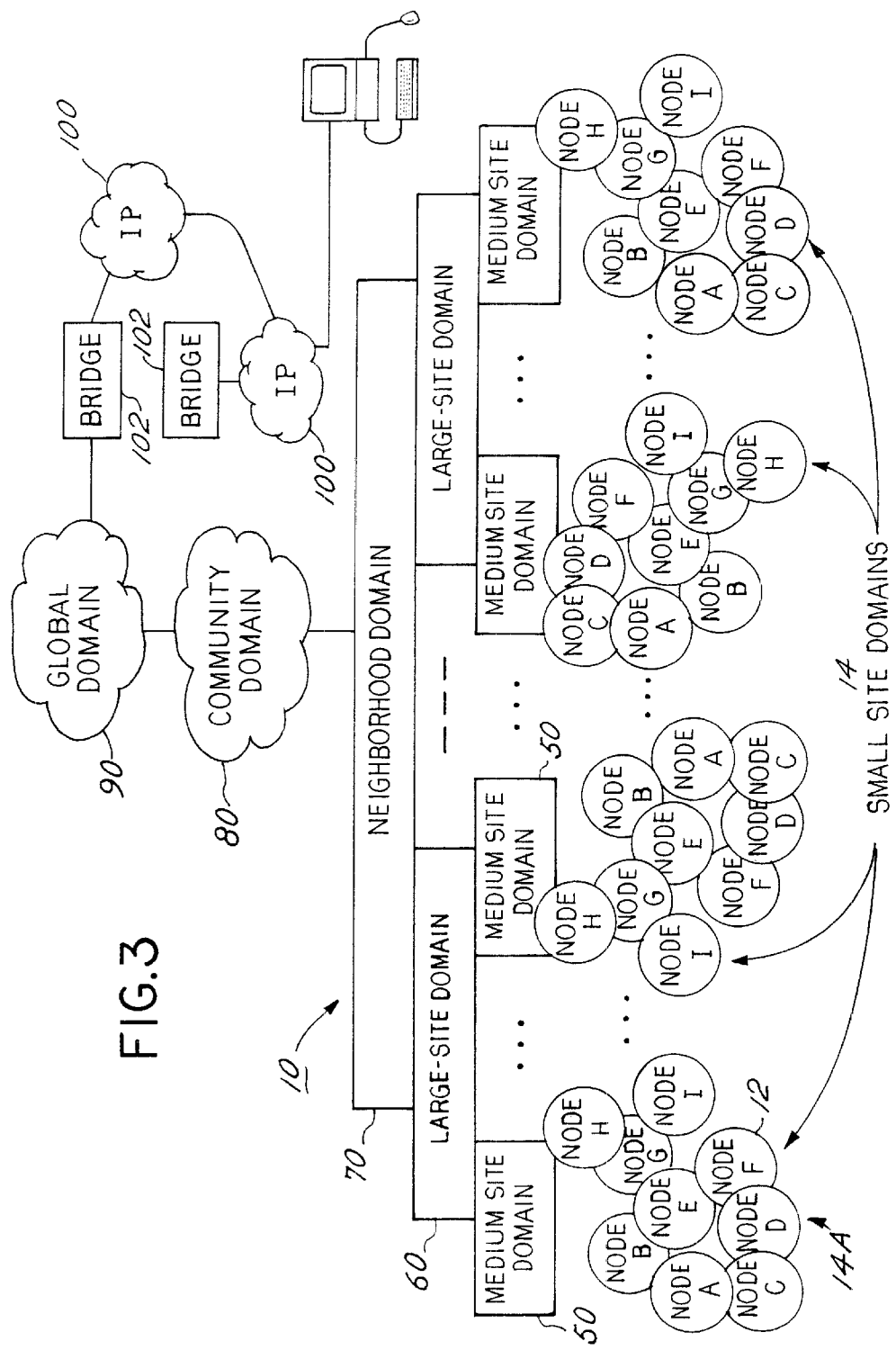
FIG. 3 is a diagram showing the network of FIG. 1 linked by higher level or larger scale networks to neighborhood or global Internet Protocol local or wide area networks.

As noted above, the small site domain is where the individual node is physically located. In a preferred embodiment, if more than 100 nodes exist at a site (residence, office, warehouse, etc.), the nodes are partitioned into multiple small site domains, all under a medium site domain 50. The architecture is illustrated in FIG. 3. A domain bridging device or node is used to communicate between the multiple domains, e.g., at node H in FIG. 3 which links the other nodes in the small site domain 14A to the medium site 50. Similarly, if there are too many medium site devices (e.g., 100), then a large site domain 60 is defined, with associated medium site domain to large site domain bridging devices or nodes implemented. These bridging devices or nodes can take the form of a IP router, bridge, or other known type of communications device known and commercially available, the details of which are not particularly important.

Referring to FIGS. 1 and 3, communication between physical locations or sites is accomplished via a neighborhood domain 70. A site-to-neighborhood bridging device would be used to accomplish this inter-domain communication. As one possible implementation, the small antenna 16 mounted to the roof of the site 14 (e.g., house) is used to communicate in a store and forward fashion with other houses in a neighborhood, in much the same fashion in which nodes 12 within a site communicate with each other.

Communications outside of the neighborhood domain 70 takes place through bridges to community and global domains 80, 90 (which could be local and wide area enterprise networks, respectively). It is envisioned that these community and global networks 80 and 90 transition to routed domains 100, i.e., IP-based networks at the edges of the neighborhood domains, or even within a site, at a bridge 102 to a local or wide area IP network.

In the network architecture of FIGS. 1 and 3, the elements of the network will typically fall into one of three different classes or types of devices:

(a) Mobile devices—these devices do not ordinarily store and forward packets, but rather simply look at the packets to determine if they are addressed to the mobile device. A mobile device may, however, initiate the sending of a packet.

(b) Simple Devices—these devices are single-function devices that operate with little or no "intelligence". These devices always store and forward packets received by them. They also may initiate sending of packets, or receive packets directed to them. Examples of these types of devices would be temperature senders of a HVAC system, simple controls, doorbell buttons or doorbell ringers of a security system, a sprinkler nozzle in a sprinkler system, etc.

(c) Controller devices—these devices serve a specific function, such as an HVAC thermostat, sprinkler controller, alarm generator, etc., and have more intelligence. These devices are capable of initiating operations, processing packets from other nodes, or originating packets for other devices. These devices always store and forward packets.

(d) Domain bridging devices—these devices are used to organize a network into subnetworks, or subnets, and act as bridges between domains. They will typically be embodied in some piece of telecommunications equipment.

(e) Inter-network Bridging Devices—these devices are used to bridge data generated on the network 10 of FIG. 1 or 3 onto a routed IP-based network, e.g., Ethernet LAN or WAN. These devices will typically be implemented in a switch, router or bridge communication device.

The individual elements of the network 10 can also be characterized as being a member of a particular class, based on the expected or actual rate at which they generate packets onto the network 10. As an example, the classes could be defined as follows:

Class 1 device—generates a message or packet less than twice per minute on average.

Class 10 device—generates a message or packet less than once every 5 minutes, on average.

Class 100 device—generates a message or packet less than once every 50 minutes, on average.

In order to manage and control the bandwidth usage on any particular subnet, it is contemplated that a typical subnet can have up to 1000 class 100 devices, 100 class 10 devices, or 10 class 1 devices, or any mix of class 1, 10 and 100 devices that would result in loading equivalent to 10 class 1 devices. This arrangement is based on the bandwidth of the physical layer implemented, and will vary for faster networks.

A low-cost RF network implementation of the invention works using a store and forward mechanism. Each packet received by a node is re-transmitted to all adjacent nodes in range only once. This process floods the subnet or site with the contents of the packet, insuring that all nodes, including the intended recipient, will receive it. To avoid infinite loops due to this topology, such as due to the fact that nodes can hear each other and a given pair of nodes could transmit the same packet endlessly between each other, the de-looping feature of the invention is implemented.

The de-looping code, placed in field 26 of every packet (see FIG. 2) is therefore used to prevent packets, which have been sent to all adjacent nodes, from being transmitted if the receiving node has already done so once before. Each node on a subnet must have a unique 8 bit de-looping code. Each packet 20 has a two-bit packet sequence number in field 32.

An array of 256 two-bit codes is stored at each node, one set per possible de-looping code. The combination of the de-looping code and the packet sequence number is used to determine whether the packet currently in the node's transmit buffer is the same as the last packet seen from the node associated with the de-looping code. If the de-looping code and packet sequence numbers match, the packet is discarded as it has already been sent. If not, the packet is retransmitted to pass it on to any node which has not yet seen it. In every case, each node in the system will transmit the packet exactly once.

The determination or assignment of the de-looping codes is as follows. Each node has an eight bit de-looping code which is unique within the subnet. The code is determined in the following iterative process:

(1) An initial value is taken from the least significant 8 bits of the node's MAC address.

(2) A null-addressed packet is then transmitted to the other nodes on the subnet. Any node which receives the packet and has the same 8 bit code responds by picking a new 8-bit code, at random. The new code is used in sending out another null-addressed packet.

(3) Steps (1) and (2) are repeated until all the nodes on the subnet have selected a unique code. In a fully populated network or system, there will be at most 100 nodes per subnet (given the class and loading design described above). With 256 possible 8 bit de-looping codes, each attempt to determine a new code by a node will have a likelihood of failure of 99/256 or 39 percent. That is, 99 of the 256 possible codes will already have been selected by the other nodes. Two attempts in this iterative process reduces the failure rate to $(99/256)^2$, or 15 percent. After 3 attempts, the probability of duplication is $(99/256)^3$ or 6 percent. The probability of duplication goes below 1 percent after two more iterations. This implies that for even a fully populated network, it will take only a few iterations for all the nodes in the subnet to be assigned unique de-looping codes.

Use of subnet addressing in the subnet ID field 24 allows for nodes to be logically organized into different groups or subnetworks. The 48 bit subnet ID number is used to identify the particular subnet that the packet is to be transmitted on. If a packet is received by a node with a subnet ID which differs from the subnet the node is assigned to, the packet is ignored. Note that adjacent nodes in any site may be logically a part of different subnets. Thus, the elements or nodes in a security system may be assigned to one subnet and the nodes or elements in a HVAC system may be assigned to another subnet. Even though nodes of both systems may be in range of each other, they will ignore all received packets that have subnet ID for a system they are not grouped in.

The flooding of packets in any subnet when a packet is transmitted has the potential for collisions, should the nodes attempt simultaneous retransmission of the packet. A very simple method for determining access to the RF channel is therefore implemented. All the nodes monitor the RF channel and if a carrier is detected (i.e., indicating that a transmission is currently in progress), then the node's transmission is disabled. Following the end of the transmission, the method assumes that a collision would occur. Accordingly, all the nodes implement an exponential back-off algorithm to cause each node to back off (i.e., avoid transmission), for some random period of time and then transmitting. Since all the nodes are backing off for randomly determined periods of time (and each presumably different from the other), the likelihood of a collision is greatly reduced.

In many conceivable implementations of the invention, the population of the domains, particular the small site domains, will be sparse. In a typical situation, shown in FIG. 4, there exists a small site domain 14 with nodes A–L 12, but no large site domain or medium site domain. In these types of cases, the network 10 automatically collapses, i.e., reconfigures, the three domains, small, medium and large, into a single domain. This reconfiguring of the network 10 is done by a controller (not shown) in the neighborhood domain, the domain over the missing medium and large site domains. Each of the domain bridging devices, i.e., node L in small site domain 14B and node D in small site domain 14C of FIG. 4, sends out a periodic packet designated a "heartbeat" packet to the neighborhood domain. Over a period of time, the neighborhood domain controller or bridge will have received the "heartbeat" packets, or other packets, from the domains below it. The neighborhood domain controller uses this information to determine the highest level or domain of a device within range. This may be a simple node residing in a small site domain, as in the case of domains 14B and 14C, or it may be a bridge controller for medium and large site domains, e.g., a bridge controller in large site domain 60 A of FIG. 4. The neighborhood domain bridge 70 then will automatically accept and handle (redirect) all packets intended for the missing domains. This allows a network to automatically configure and reconfigure as necessary with little or no human intervention.

Various modifications and alternative embodiments from the above-described presently preferred embodiment will be apparent to persons of skill in the art. As noted above, the hardware details and type of system in which the methods of the present invention are implemented are not considered to be critical or particularly important. The scope of the present invention is thus not limited to the preferred embodiments, but rather is to be determined by reference to the appended claims.

We claim:

1. A method of networking a plurality of wireless nodes, said nodes organized into a logical domain, comprising the steps of:

(a) generating a packet in a first node and broadcasting said packet to one or more nodes that are in range of said first node, said packet comprising a field containing an anti-looping code;

(b) receiving said packet in a second node in range of said first node, said second node re-transmitting said packet to additional nodes, including a third node, in said domain that are within range of said second node;

(c) processing said anti-looping code to ensure that said packet is broadcast a single time; and (d) broadcasting said packet from said third node to additional nodes in said logical domain until all nodes in said domain have received said packet, each of said third and additional nodes in said domain processing said anti-looping code to thereby ensure that each of said third and additional nodes rebroadcasts said packet only a single time.

2. The method of claim 1, wherein said nodes are organized within a network comprising multiple hierarchical domains, and wherein said packet further comprises a field containing information identifying a domain type, said domain type indicating the highest domain to which said packet is to be broadcast.

3. The method of claim 1, wherein said packet further comprises a field containing information uniquely identifying nodes in a logical sub-network, such that any nodes receiving said packet which are not members of said logical sub-network do not respond to said packet.

4. The method of claim 1, wherein said packet further comprises a field containing information uniquely identifying nodes in a site, such that any nodes receiving said packet which are not located at said site do not respond to said packet.

5. The method of claim 1, wherein said method is implemented by wireless nodes in an office building.

6. The method of claim 1, wherein said wireless nodes comprise elements of a security system.

7. The method of claim 1, wherein said wireless nodes comprise elements of a HVAC system.

8. The method of claim 1, wherein said method is implemented by wireless nodes in a warehouse.

9. The method of claim 1, wherein said method is implemented by wireless nodes in a residence.

10. The method of claim 1, wherein said wireless nodes include a general purpose computer.

11. The method of claim 1, wherein said wireless nodes comprise nodes of a sprinkler system.

12. A method of networking a plurality of wireless nodes, said nodes organized into a logical domain, comprising the steps of:

generating a packet in a first node in said plurality of wireless nodes;

broadcasting said packet from said first node to other nodes within range of said first node;

repeatedly broadcasting said packet until each of said plurality of wireless nodes in said logical domain have received said packet;

wherein said packet contains an anti-looping code wherein each of said nodes that receives a broadcast of said packet from another of said nodes processes said anti-looping code and thereby only broadcasts said packet a single time.

13. The method of claim 12, wherein each of said nodes gain access to an RF network linking said nodes together to broadcast said packet according to the following procedure:

(a) detecting an existing transmission on said RF channel, and responsively disabling-transmission of said node on said RF network;

(b) detecting a termination of said existing transmission; and (c) initiating transmission on said RF channel after waiting a random period of time after said termination of said existing transmission has been detected.

14. A node of a wireless network, comprising a software program generating a packet for broadcast to other nodes in said network, said packet having a structure comprising:

a field containing a de-looping code, said de-looping code comprising a series of bits, wherein each node in said wireless network is assigned a unique de-looping code; and a field containing a packet sequence number;

said software program further comprising instructions processing said de-looping code and said packet sequence number to determine whether said de-looping code and packet sequence number match a packet sequence number and de-looping code of a previous packet broadcast by said node, and wherein said packet is transmitted to other nodes in said network if a match does not exist.

15. The node of claim 14, wherein said node implements an exponential back-off algorithm before transmitting said packet if a current transmission is detected.

16. The node of claim 14, wherein said packet structure further comprises one or more reserved fields.

17. The node of claim 14, wherein said packet further comprises a subnet identification field.

18. The node of claim 14, wherein said packet further comprises a destination domain field.

* * * * *